United States Patent [19]

Kato

[11] Patent Number: 4,974,818
[45] Date of Patent: Dec. 4, 1990

[54] FLUID-FILLED ELASTIC MOUNTING STRUCTURE HAVING STOPPER DEVICE

[75] Inventor: Rentaro Kato, Kasugai, Japan

[73] Assignee: Tokai Rubber Industries, Ltd., Aichi, Japan

[21] Appl. No.: 437,627

[22] Filed: Nov. 17, 1989

[30] Foreign Application Priority Data

Nov. 21, 1988 [JP] Japan .................... 63-151366[U]

[51] Int. Cl.$^5$ .............................................. F16F 5/00
[52] U.S. Cl. .................................. 267/140.1; 248/562; 267/141
[58] Field of Search ................ 248/562; 267/217, 219, 267/220, 140, 140.1, 141

[56] References Cited

U.S. PATENT DOCUMENTS 4,787,609 11/1988 Dan et al. .................. 267/140.1

FOREIGN PATENT DOCUMENTS 3908718 9/1989 Fed. Rep. of Germany ... 267/140.1
57-9340 1/1982 Japan .
0055429 3/1986 Japan .................. 267/140.1

Primary Examiner—Duane A. Reger
Attorney, Agent, or Firm—Oliff & Berridge

[57] ABSTRACT

A fluid-filled elastic mounting structure including a first and a second support member, an elastic body for elastically connecting the first and second support members, a closure member which partially defines a fluid chamber, a partition assembly for dividing the fluid chamber into a pressure-receiving chamber and an equilibrium chamber, and at least one orifice for fluid communication between the pressure-receiving chamber and the equilibrium chamber. The first support member includes a hollow cylindrical member extending in a direction perpendicular to the load-receiving direction. The mounting structure of the invention further includes a stopper member which is formed from a plate-like member and secured to said second support member, so as to extend from the second support member toward the first support member, and surround the first support member such that the hollow cylindrical member is spaced apart from the stopper member by a suitable distance. This stopper member serves to limit an amount of relative displacement of the first and second support members away from each other in the load-receiving direction. Further, a rubber layer is provided for covering the stopper member over a substantially entire surface area thereof, the rubber layer being integrally formed with the elastic body.

7 Claims, 3 Drawing Sheets

FLUID-FILLED ELASTIC MOUNTING STRUCTURE HAVING STOPPER DEVICE

BACKGROUND OF THE INVENTION

1. Field of the Invention

The present invention is concerned generally with a fluid-filled elastic mounting structure, and more particularly with a fluid-filled elastic mounting structure having a stopper device adapted to limit an amount of relative displacement between two support members of the structure when an excessive amount of vibrational load is applied to the mounting structure.

2. Discussion of the Prior Art

There is known a mounting structure which is interposed between two members of a vibration transmission system, for flexibly connecting these two members or supporting one of the two members on the other member in a vibration damping and/or isolating fashion. As an example of such a mounting structure, laid-open Publication No. 57-9340 of unexamined Japanese Patent Application discloses a so-called fluid-filled elastic mounting structure including (a) a first and a second support member which are opposed to and spaced apart from each other in a load-receiving direction in which a vibrational load is applied to the mounting structure, (b) an elastic body interposed between the first and second support members, for elastically connecting the first and second support members, (c) a closure member which has a flexible portion and which is secured to the second support member, so as to cooperate with the elastic body to define therebetween a fluid chamber filled with a non-compressible fluid, (d) a partition assembly disposed within the fluid chamber, so as to divide the fluid chamber into a pressure-receiving chamber on the side of the elastic body, and an equilibrium chamber on the side of the closure member, and (e) an orifice for fluid communication between the pressure-receiving chamber and the equilibrium chamber. The orifice is tuned to a desired frequency range. The thus constructed fluid-filled elastic mounting structure is capable of damping or isolating the desired frequency range of vibrations, based on resonance of the fluid mass flowing through the orifice between the pressure-receiving and equilibrium chambers upon application of the vibrations.

The fluid-filled elastic mounting structure described above is used, for example, as an engine mount for attaching an engine or engine unit of a motor vehicle to the body of the vehicle. To facilitate the installation of such an engine mount on the vehicle, it has been proposed that the first support member includes a hollow cylindrical member which is positioned to extend in a direction perpendicular to the load-receiving direction of the mount. In this case, the first support member is attached to the engine unit such that a bolt or other connecting member fixed to the engine unit is inserted through the hollow cylindrical member of the first support member.

The mounting structure of the above type is generally required to include a stopper device adapted to limit an amount of deformation of the elastic body, or an amount of displacement of the two members connected to the first and second support members, upon application of an excessive amount of vibrational load to the mounting structure. To this end, the stopper device usually has a generally plate-like metallic member which extends from the second support member toward the first support member, so as to limit an amount of displacement of the first support member relative to the second support member in the load-receiving direction.

However, the applicant of the present invention has recognized the following problem encountered in respect of the stopper device as described above. Namely, since the fluid-filled elastic mounting structure having the pressure-receiving and equilibrium chambers is of relatively large size, the plate-like metallic stopper member used in the mounting structure tends to be accordingly large-sized in its length in particular, and have a relatively low degree of stiffness or rigidity and a relatively low resonance frequency. In consequence, upon application of a vibrational load to the mounting structure, there arise unfavorable noises and vibrations which are amplified due to resonance of the metallic stopper member. In this respect, it is extremely difficult to improve the rigidity of the stopper member by increasing its thickness, because of limitation in the installation space within the mounting structure.

In the fluid-filled elastic mounting structure having the hollow cylindrical member as the first support member as described above, the metallic stopper member is generally a large-sized, U-shaped strip, which extends from the second support member so as to surround the hollow cylindrical member such that the hollow cylindrical member is spaced apart from the stopper member by a suitable distance. In this case, the resonance frequency of the stopper member may be lowered to 600 Hz or lower, while the mounting structure practically used for the motor vehicle is required to isolate input vibrations having 600 Hz or lower frequencies. Thus, the resonance of the stopper member has great adverse influence upon the vibration isolating capability of the mounting structure.

SUMMARY OF THE INVENTION

It is therefore an object of the present invention to provide a fluid-filled elastic mounting structure which has a metallic stopper member, and exhibits excellent vibration damping and/or isolating characteristics, and wherein the stopper member has a reduced or substantially no adverse influence on the vibration damping-/isolating capability, due to the resonance of the metallic stopper member used therein.

The above object may be accomplished according to the principle of the present invention, which provides a fluid-filled elastic mounting structure including (a) a first and a second support member which are opposed to and spaced apart from each other in a load-receiving direction in which a vibrational load is applied to the mounting structure, (b) an elastic body interposed between the first and second support members, for elastically connecting the first and second support members, (c) a closure member which has a flexible portion and which is secured to the second support member, so as to cooperate with the elastic body to define therebetween a fluid chamber filled with a non-compressible fluid (d) a partition assembly disposed within the fluid chamber, so as to divide the fluid chamber into a pressure-receiving chamber on the side of the elastic body, and an equilibrium chamber on the side of the closure member, and (e) at least one orifice for fluid communication between the pressure-receiving chamber and the equilibrium chamber, wherein the improvement comprises the first support member including a hollow cylindrical member which is positioned to extend in a direction perpendicular to the load-receiving direction of the mounting structure; a stopper member which is formed from a plate-like member and secured to the second support member, the stopper member extending from the second support member toward the first support member and surrounding the first support member such that the hollow cylindrical member is spaced apart from the stopper member by a suitable distance, the stopper member limiting an amount of relative displacement of the first and second support members away from each other in the load-receiving direction; and a rubber layer for covering the stopper member over a substantially entire surface area thereof, the rubber layer being integrally formed with the elastic body.

In the fluid-filled elastic mounting structure of the present invention constructed as described above, the vibration level of the stopper member is effectively reduced by the rubber layer covering the surface of the stopper member. Accordingly, even if the mounting structure employs a comparatively thin and long stopper member, the amplification of noises and vibrations caused by the resonance of the stopper member is effectively reduced or eliminated, without taking costly and cumbersome measures, such as changing the material of the stopper member, or increasing its thickness. Thus, the fluid-filled elastic mounting structure exhibits excellent vibration damping and/or isolating characteristics without an adverse influence of the stopper member.

Since the instant mounting structure is constructed such that the rubber layer for covering the stopper member is integrally formed with the elastic body connecting the first and second support members together, the formation of the rubber layer does not require any additional manufacturing step which may result in poor efficiency and increased cost of manufacture of the mounting structure.

In one form of the present invention, at least a part of the second support member is covered with the rubber layer.

In another form of the present invention, the stopper member takes the form of an inverted U-shaped strip having a pair of arms, and is secured at free ends of the arms to the second support member.

The stopper member may be provided with ribs which are formed in laterally opposite side portions thereof, such that the ribs extend over an entire length of the stopper member.

The rubber layer may have cushioning portion and the hollow cylindrical member may have a cushioning member formed thereon so as to face the cushioning portion. In this case, the cushioning portion and the cushioning member are abuttable on each other when the first and second support members are displaced away from each other in the load-receiving direction. The cushioning member may be integrally formed with the elastic body.

The elastic body may have a stopper portion which is abuttable on the first support member, to thereby prevent an excessive amount of relative displacement of the first and second support members toward each other in the load-receiving direction.

BRIEF DESCRIPTION OF THE DRAWINGS

The above and optional objects, features and advantages of the present invention will become more apparent by reading the following detailed description of a presently preferred embodiment of the invention, when considered in connection with the accompanying drawings, in which.

DETAILED DESCRIPTION OF THE PREFERRED EMBODIMENT

Figure 1:
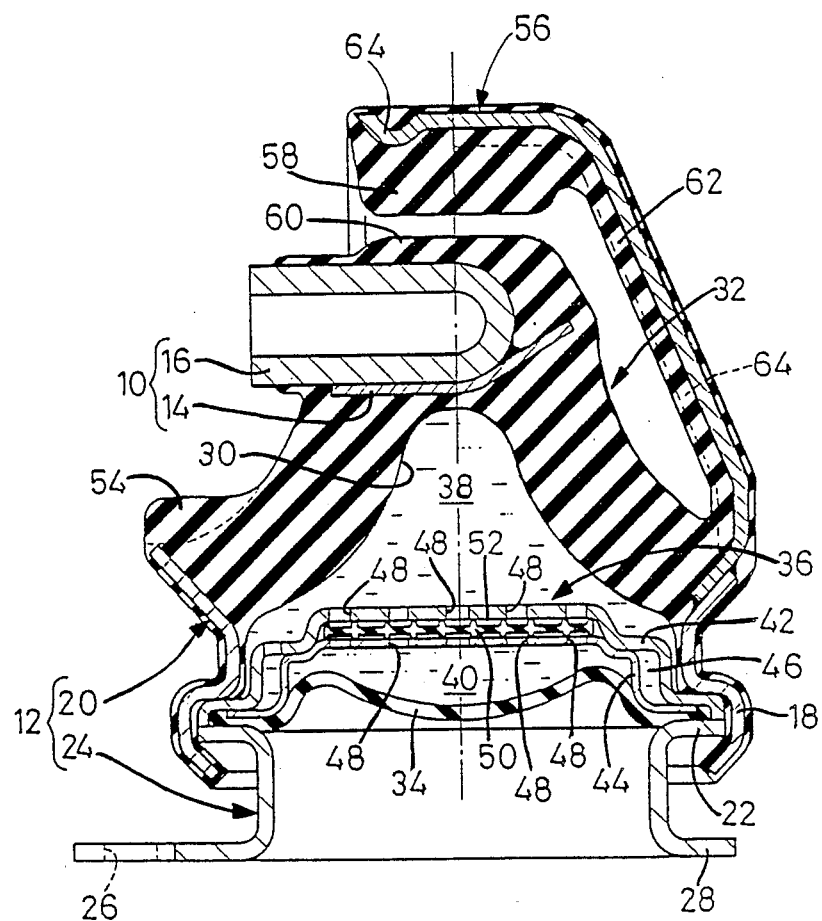
FIG. 1 is an elevational view in vertical cross section of one embodiment of a fluid-filled elastic mounting structure of the invention in the form of an engine mount for a motor vehicle, taken along line I—I of FIG. 2.
Figure 2:
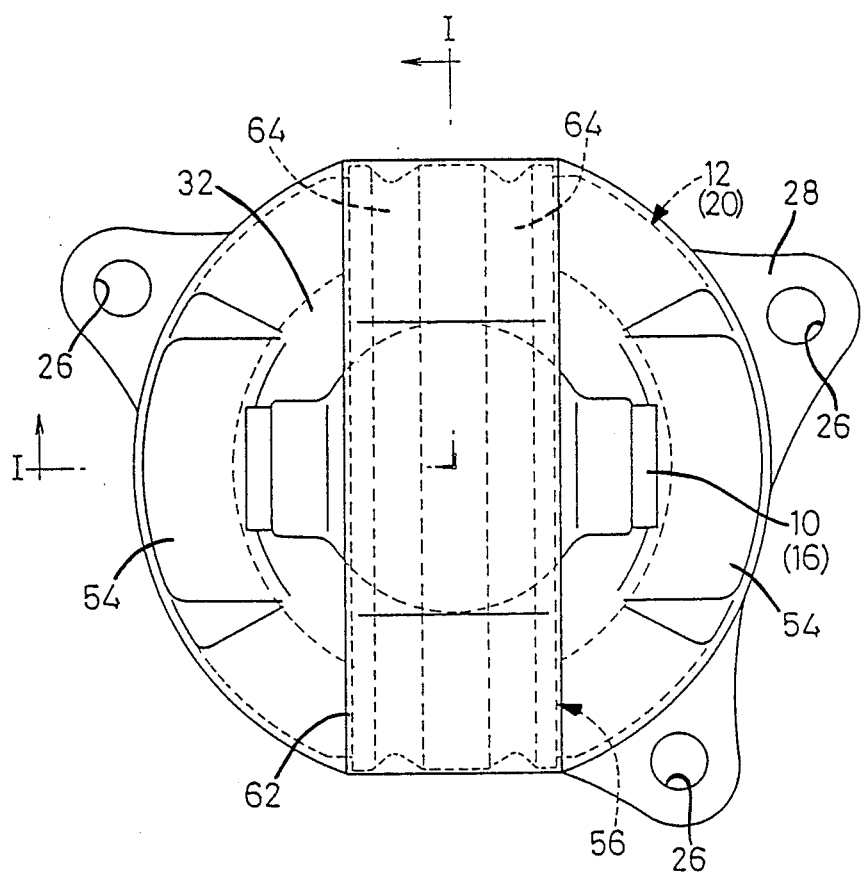
FIG. 2 is a plan view of the engine mount shown in FIG. 1.

Referring to FIGS. 1 and 2, reference numerals 10 and 12 denote a first and a second metal support of the engine mount, respectively. The first and second metal supports 10, 12 are disposed opposite to each other in a spaced-apart relation in a load-receiving direction (vertical direction in FIG. 1) in which a vibrational load is applied to the instant engine mount. These first and second metal supports 10, 12 are elastically connected by a elastic body 32 interposed therebetween. The instant engine mount is installed on the motor vehicle to flexibly mount an engine unit on the body of the vehicle, such that the first metal support 10 is attached to the engine unit, while the second metal support 12 is attached to the vehicle body.

The first metal support 10 consists of a generally disk-like member 14, and a relatively thick-walled hollow cylindrical member 16 secured to the upper surface of the the disk-like member 14. The first metal support 10 is attached to the engine unit, such that a suitable shaft or rod integrally formed with the engine unit is inserted through the hollow cylindrical member 16.

On the other hand, the second metal support 12 consists of a tapered cylindrical member 20 which has a calking portion 18 at its one axial end remote from its tapered portion, and a flanged cylindrical member 24 which has two integrally formed flanges 22, 28 radially outwardly extending from its opposite axial ends. The flanged cylindrical member 24 is calked at its upper flange 22 to the calking portion 18 of the tapered cylindrical member 20. The lower flange 28 has a plurality of mounting holes 26 formed therethrough, so that the second metal support 12 is fixed at the lower flange 28 to the vehicle body.

The first and second metal supports 10, 12 constructed as described above are positioned such that the disk-like member 14 of the first metal support 10 is disposed opposite to the upper opening of the tapered cylindrical member 20 of the second metal support 12, and such that the hollow cylindrical member 20 of the first metal support 10 is spaced apart from the second metal support 12, and extends in the direction perpendicular to the load-receiving direction of the engine mount, i.e., perpendicular to the axis of the second metal support 12.

The elastic body 32 interposed between the first and second metal supports 10, 12 assumes a generally truncated conical shape in the vertical cross section. The elastic body 32 is secured by vulcanization at its small-diameter end to the first metal support 10, and at its large-diameter end to the tapered cylindrical member 20 of the second metal support 12. Thus, the first and second metal supports 10, 12 are elastically connected and united by means of the elastic body 32.

The elastic body 32 has recessed portion 30 which is open in the large-diameter end surface of the body 32. Adjacent to the opening of the recessed portion 30, there is fixedly disposed a closure member in the form of a flexible diaphragm 34. This flexible diaphragm 34 is secured to the second metal support 12, such that the radially outer circumferential edge of the diaphragm 34 is fluid-tightly gripped by and between the calking portion 18 of the tapered cylindrical member 20 and the upper flange 22 of the flanged cylindrical member 24. Thus, the opening of the recessed portion 30 is fluid-tightly closed by the flexible diaphragm 34. In other words, there is formed an enclosed fluid chamber between the flexible diaphragm 34 and the recessed portion 30 of the elastic body 32.

The enclosed fluid chamber as described above is filled with a suitable non-compressible fluid, such as water, alkylene glycol, polyalkylene glycol, or silicone oil. The filling is accomplished during assembling of the flexible diaphragm 34 and the second metal support 12 within the non-compressible fluid.

Within the enclosed fluid chamber, there is fixedly disposed a generally hat-shaped partition assembly 36 with its bottom facing the first metal support 10. The radially outer circumferential edge of the partition assembly 36 is gripped by and between the corresponding calked portions of the two cylindrical members 20, 24 of the second metal support 12, together with the flexible diaphragm 34 as described above. The partition assembly 36 extends in the direction perpendicular to the load-receiving direction of the engine mount, to thereby divide the fluid chamber into a pressure-receiving chamber 38 on the side of the elastic body 32, and an equilibrium chamber 40 on the side of the diaphragm 34. The pressure-receiving chamber 38 is subject to a change in the fluid pressure upon application of a vibrational load to the engine mount, while the equilibrium chamber 40 is prevented from the corresponding pressure change due to deformation of the flexible diaphragm 34.

The partition assembly 36 consists of a first and a second hat-shaped partition members 42, 44 which are superposed on each other in an axial direction of the second metal support 12. These partition members 42, 44 have respective cylindrical portions which cooperate with each other to define an annular restricted passage between the facing surfaces thereof. This restricted passage extends over a substantially entire circumference of the partition assembly 36, and is held in fluid communication with the pressure-receiving and equilibrium chambers 38, 40. Thus, the two partition members 42, 44 provide an orifice passage 46 for fluid communication between the two chambers 38, 40.

The first and second partition members 42, 44 have respective bottom walls which are superposed on each other to define a generally flat space 52 therebetween. This flat space 52 extends in the direction perpendicular to the load-receiving direction, and is held in fluid communication with the pressure-receiving and equilibrium chambers 38, 40, through communication holes 48 formed through the bottom walls of the partition members 42, 44. A rubber plate 50 having a relatively small thickness is movably accommodated within the flat space 52. Upon application of a vibrational load to the instant engine mount, the non-compressible fluid is allowed to flow between the pressure-receiving and equilibrium chambers 38, 40, through the communication holes 48 and the flat space 52, based on deformation or displacement of the rubber plate 50. The rubber plate 50 is provided with a plurality of bosses formed on the opposite surfaces thereof, such that the bosses abut on the mutually facing surfaces of the bottom walls of the two partition members 42, 44.

When a vibration load is applied between the first and second metal support 10, 12, a pressure difference occurs between the pressure-receiving and equilibrium chambers 38, 40, and the non-compressible fluid is forced to flow through the orifice 46 or the communication holes 48 (flat space 52), between the two chambers 38, 40. Thus, the instant engine mount exhibits excellent vibration damping and isolating characteristics, based on the resonance of the fluid mass flowing through the orifice 46 and that of the fluid mass flowing through the communication holes 48.

More specifically described, the orifice 46 is tuned of its length and cross sectional fluid flow area, in order to provide high vibration damping characteristics based on the resonance of the fluid mass flowing therethrough, when the engine mount receives low-frequency vibrations such as engine shakes and bounces. The communication holes 48 of the partition assembly 36 are tuned of its length and cross sectional fluid flow area, in order to provide a sufficiently low dynamic spring constant or high vibration isolating characteristics based on the resonance of the fluid mass flowing therethrough, when the engine mount receives medium- to high-frequency vibrations such as engine-idling vibrations and secondary vibrations of the engine, which cause substantially no fluid flow through the orifice 46.

The elastic body 32 includes two stopper portions 54 formed on its outer circumferential surface. More specifically, the two stopper portions 54 are integrally formed on the large-diameter portions of the elastic body 32, which are aligned with the opposite axial end portions of the hollow cylindrical member 16, in the circumferential direction of the elastic body 32, as indicated in FIGS. 1 and 2. The stopper portions 54 are spaced a suitable distance from the hollow cylindrical member 16, in the load-receiving direction of the engine mount, so that the axial end portions of the cylindrical member 16 and/or a shaft member inserted through the member 16 may abut on the stopper portions 54, to thereby avoid an excessive amount of relative displacement of the first and second metal supports 10, 12 toward each other in the load-receiving direction, when a vibrational load having a large amplitude is applied to the engine mount.

The instant engine mount is provided with an elongate metallic stopper plate 56, in the form of an inverted U-shaped member formed from a strip or sheet member. The opposite arms of the U-shaped strip of the stopper plate 56 are welded at their free ends to the open ends of the tapered cylindrical member 20 of the second metal support 12, so that the first metal support 10 is surrounded by the stopper plate 56. The stopper plate 56 has an upper portion which extends above the hollow cylindrical member 16 of the first metal support 10, in the direction perpendicular to the axis of the cylindrical member 16, i.e., in the load-receiving direction. In the present embodiment, the stopper plate 56 is provided with a pair of reinforcing ribs 64 formed in the laterally opposite side portions thereof, extending over its entire length, for enhancing stiffness or rigidity of the stopper plate 56.

The U-shaped stopper plate 56 is covered over its entire surface area with a rubber layer 62 which is integrally formed with the elastic body 32 described above and which is secured by vulcanization to the stopper plate 56. In the present embodiment, the rubber layer 62 extends from the stopper plate 56 toward the tapered cylindrical member 20 of the second metal support 12, so that the surface of the cylindrical member 20 is also covered with the rubber layer 62.

The rubber layer 62 has a cushioning portion 58 formed on the lower surface of the upper portion of the stopper plate 56, while the outer circumferential surface of the hollow cylindrical member 16 is partially covered by a cushioning member 60. This cushioning member 60 is integrally formed with the elastic body 32. In this arrangement, an abutting contact of the cushioning portion and cushioning member 58, 60 formed on the stopper plate 56 and the cylindrical member 16 may prevent an excessive amount of relative displacement of the first and second metal supports 10, 12 away from each other in the load-receiving direction.

In the instant engine mount constructed as described above, the vibrations which occur at the U-shaped stopper plate 56 may be isolated or damped due to the provision of the rubber layer 62 formed thereon, whereby vibration levels measured at the stopper plate 56 are effectively reduced. Consequently, the instant engine mount no longer suffers from the conventional problem that its vibration damping and/or isolating capability is deteriorated due to the resonance of the stopper plate 56.

Figure 3:
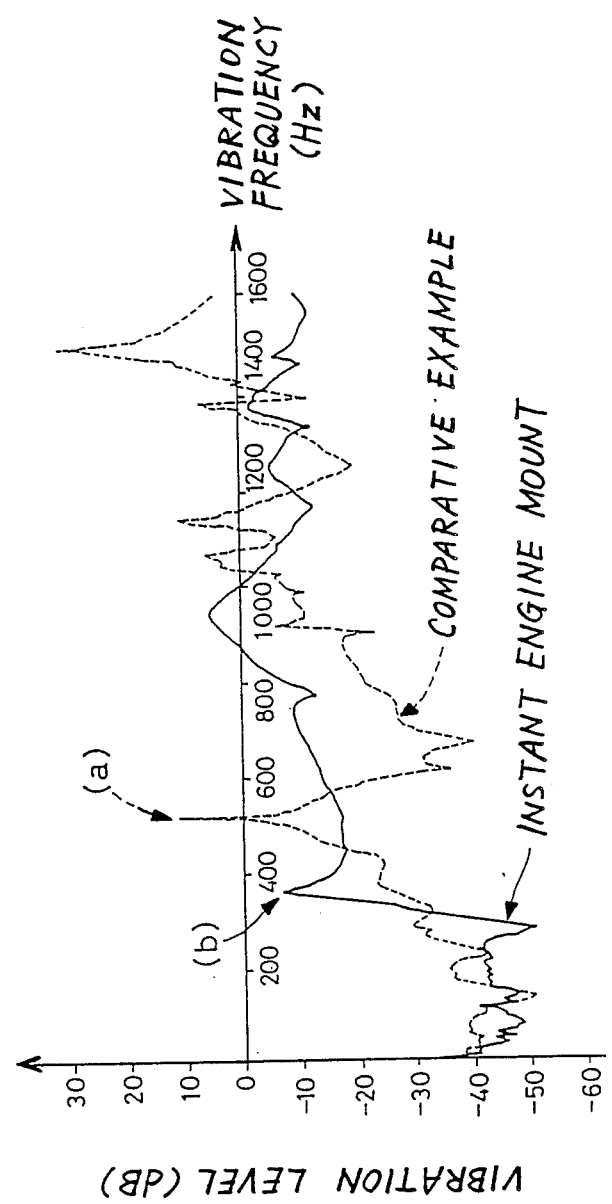
FIG. 3 is a graph showing the relationship between frequencies of input vibrations, and vibration levels measured at a stopper plate, with respect to the engine mount of FIG. 1 and that of a comparative example.

Referring to a graph of FIG. 3, there is shown a relationship between frequencies (Hz) of the vibrations applied to the instant engine mount, and the vibration levels which were measured at the U-shaped stopper plate 56. As a comparative example, there was prepared an engine mount which is identical with the instant engine mount except that the surface of the stopper plate 56 is not covered with a rubber layer like the rubber layer 62 used in the present embodiment. The above-described relationship with respect to the comparative example (indicated by a dashed line) is also shown in FIG. 3.

It will be understood from the graph of FIG. 3 that the provision of the rubber layer 62 contributes to reducing the vibration level at a resonance point (indicated by (a) and (b) in FIG. 3) within a frequency range not higher than 600 Hz, at which point the stopper plate 56 provides a considerably high vibration level due to its resonance. It is to be noted that the vibration level of the resonance point (b) associated with the instant engine mount is effectively reduced by as large as about 18.5 dB, as compared with that of the resonance point (a) associated with the comparative example.

It follows from the above description that the instant engine mount having such a large-sized stopper plate 56 is capable of reducing or preventing the noises or vibrations caused by resonance of the stopper plate 56, without taking costly and cumbersome measures, such as changing the material of the stopper plate, or increasing the thickness of the plate. In this manner, the vibration damping and/or isolating capability of the instant engine mount is effectively improved.

Since the surface of the metallic stopper plate 56 of the instant engine mount is covered with the rubber layer 62, i.e., is not exposed to the atmosphere, the stopper plate 56 is not required to be subject to any particular antirust process or coating.

According to the present embodiment, the rubber layer 62 for covering the stopper plate 56 is integrally formed with the elastic body 32 disposed between the first and second metal supports 10, 12. This arrangement does not require any additional manufacturing step for providing the rubber layer 62, causing no problem of increasing the cost of manufacture of the engine mount.

While the present invention has been described in its presently preferred embodiment for illustrative purpose only, it is to be understood that the invention is not limited to the details of the illustrated embodiment, but may be otherwise embodied.

For instance the stopper plate 56 may be attached to the second metal support 12 by various known fixing means other than welding, e.g., by bolting or calking the corresponding portions of the two members. It is also possible that the stopper plate 56 and the second metal support 12 are formed as a single metal member.

While the illustrated embodiment utilizes both the orifice 46 and the communication holes 48 flat space 52), as orifice means for allowing the fluid flows between the pressure-receiving chamber 38 and the equilibrium chamber 40, it is possible to provide only one of the orifice 46 and the communication hole 48. It is also to be understood that the structure of orifice means according to the present invention is not limited to the specific structures of the orifice 46 and the communication holes 48 (flat space 52).

It will be understood that the present invention may be embodied with various other changes, alterations, modifications and improvements, which may occur to those skilled in the art, without departing from the spirit and scope of the invention defined in the following claims.

What is claimed is:

1. A fluid-filled elastic mounting structure including (a) a first and a second support member which are opposed to and spaced apart from each other in a load-receiving direction in which a vibrational load is applied to the mounting structure, (b) an elastic body interposed between the first and second support members, for elastically connecting the first and second support members, (c) a closure member which has a flexible portion and which is secured to the second support member, so as to cooperate with the elastic body to define therebetween a fluid chamber filled with a non-compressible fluid, (d) a partition assembly disposed within the fluid chamber, so as to divide the fluid chamber into a pressure-receiving chamber on the side of the elastic body, and an equilibrium chamber on the side of the closure member, and (e) at least one orifice for fluid communication between the pressure-receiving chamber and the equilibrium chamber, wherein the improvement comprises:

said first support member including a hollow cylindrical member which is positioned to extend in a direction perpendicular to the load-receiving direction of the mounting structure;

a stopper member which is formed from a plate-like member and secured to said second support member, said stopper member extending from said second support member toward said first support member and surrounding said first support member such that said hollow cylindrical member is spaced apart from the stopper member by a suitable distance, said stopper member limiting an amount of relative displacement of said first and second support members away from each other in said load-receiving direction; and a rubber layer for covering said stopper member over a substantially entire surface area thereof, said rubber layer being integrally formed with said elastic body.

2. A fluid-filled elastic mounting structure according to claim 1, wherein at least a part of said second support member is covered with said rubber layer.

3. A fluid-filled elastic mounting structure according to claim 1, wherein said stopper member takes the form of an inverted U-shaped strip having a pair of arms, said stopper member being secured at free ends of said arms to said second support member.

4. A fluid-filled elastic mounting structure according to claim 1, said stopper member is provided with ribs which are formed in laterally opposite side portions thereof, said ribs extending over an entire length of the stopper member.

5. A fluid-filled elastic mounting structure according to claim 1, wherein said rubber layer has a cushioning portion and said hollow cylindrical member has a cushioning member formed thereon so as to face said cushioning portion, said cushioning portion and said cushioning member being abuttable on each other when the first and second support members are displaced away from each other in said load-receiving direction.

6. A fluid-filled elastic mounting structure according to claim 5, wherein said cushioning member is integrally formed with said elastic body.

7. A fluid-filled elastic mounting structure according to claim 1, wherein said elastic body has a stopper portion which is abuttable on the first support member, to thereby prevent an excessive amount of relative displacement of the first and second support members toward each other in said load-receiving direction.

* * * * *